United States Patent
Narui et al.

(10) Patent No.: US 9,983,560 B2
(45) Date of Patent: May 29, 2018

(54) POSITIONING DEVICE AND PLC SYSTEM (71) Applicants: Tetsushi Narui, Chiyoda-ku (JP); Haruki Inoue, Chiyoda-ku (JP)

(72) Inventors: Tetsushi Narui, Chiyoda-ku (JP); Haruki Inoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 361 days.

(21) Appl. No.: 14/352,928

(22) PCT Filed: Dec. 11, 2012

(86) PCT No.: PCT/JP2012/082094
§ 371 (c)(1),
(2) Date: Apr. 18, 2014

(87) PCT Pub. No.: WO2013/089110
PCT Pub. Date: Jun. 20, 2013

(65) Prior Publication Data
US 2014/0249672 A1 Sep. 4, 2014

(30) Foreign Application Priority Data

Dec. 12, 2011 (WO) .................. PCT/JP2011/078720

(51) Int. Cl.
*G05B 19/05* (2006.01)
*G05B 19/19* (2006.01)
*G05B 19/416* (2006.01)

(52) U.S. Cl.
CPC ............. *G05B 19/05* (2013.01); *G05B 19/19* (2013.01); *G05B 19/416* (2013.01); *G05B 2219/42176* (2013.01)

(58) Field of Classification Search
CPC .......... G05B 2219/42176; G05B 19/05; G05B 19/19; G05B 19/416; G05B 9/02; G05B 19/0426; G06F 8/35
(Continued)

(56) References Cited

U.S. PATENT DOCUMENTS

| 4,385,358 A | * | 5/1983 | Ito | ........................ | G05B 19/425 318/573 |
| 6,903,527 B2 | * | 6/2005 | Toyozawa | ............ | G05B 19/404 318/568.13 |

(Continued)

FOREIGN PATENT DOCUMENTS

| JP | 01-064016 A | 3/1989 |
| JP | 01-123208 U | 8/1989 |

(Continued)

OTHER PUBLICATIONS

International Search Report of PCT/JP2012/082094 dated Jan. 22, 2013, 4 pages.

(Continued)

*Primary Examiner* — Thomas C Lee
*Assistant Examiner* — Tri T Nguyen
(74) *Attorney, Agent, or Firm* — Sughrue Mion, PLLC; Richard C. Turner (57) ABSTRACT

A positioning device and a programmable logic controller (PLC) system including the positioning device are provided. The positioning device includes a computing unit that analyzes a positioning start instruction that includes an operation pattern, a storage unit that stores therein an operation pattern and an analysis result obtained by the computing unit analyzing the operation pattern stored in the storage unit in association with each other, and an instruction generating unit including a processor that, when it is verified that the operation pattern stored in the storage unit corresponds to (Continued)

the operation pattern included in the positioning start instruction, reads the analysis result associated with the operation pattern stored in the storage unit and generates positioning instruction data for positioning a control target by using the read analysis result.

14 Claims, 4 Drawing Sheets

(58) Field of Classification Search
 USPC .......................................... 700/64, 245, 257
 See application file for complete search history.

(56) References Cited

U.S. PATENT DOCUMENTS

| | | | | |
|---|---|---|---|---|
| 8,331,694 | B2* | 12/2012 | Ogawara | G06F 8/43 |
| | | | | 382/218 |
| 2002/0105296 | A1* | 8/2002 | Okuyama | B25J 9/1669 |
| | | | | 318/568.16 |
| 2003/0216833 | A1* | 11/2003 | Mukai | B25J 9/1602 |
| | | | | 700/245 |
| 2005/0163637 | A1* | 7/2005 | Chang | F04B 13/00 |
| | | | | 417/476 |
| 2006/0002824 | A1* | 1/2006 | Chang | B01L 3/021 |
| | | | | 422/400 |
| 2006/0217837 | A1* | 9/2006 | Koga | G05D 1/0246 |
| | | | | 700/245 |
| 2013/0198557 | A1* | 8/2013 | Bensinger | G06F 11/1451 |
| | | | | 714/3 |

FOREIGN PATENT DOCUMENTS

| | | |
|---|---|---|
| JP | 05-006213 A | 1/1993 |
| JP | 08-123521 A | 5/1996 |
| JP | 10-301614 A | 11/1998 |
| JP | 2000-039913 A | 2/2000 |
| JP | 2000-181525 A | 6/2000 |
| JP | 2006-350768 A | 12/2006 |

OTHER PUBLICATIONS

Communication dated Sep. 4, 2015 from the Korean Intellectual Property Office issued in corresponding application No. 10-2014-7016389, 8 pages.

* cited by examiner

POSITIONING DEVICE AND PLC SYSTEM

CROSS REFERENCE TO RELATED APPLICATIONS

This is a National Stage of International Application No. PCT/JP2012/082094 filed Dec. 11, 2012, claiming priority based on International Patent Application No. PCT/JP2011/078720 filed Dec. 12, 2011, the contents of all of which are incorporated herein by reference in their entirety.

FIELD

The present invention relates to a positioning device and a PLC system.

BACKGROUND

Heretofore, there have been PLC (programmable controller) systems that include a CPU unit (a unit that executes a ladder program) and a positioning device that receives a positioning start instruction from the CPU unit and supplies positioning instruction data to a drive unit. In the positioning devices of PLC systems, a delay time (positioning start time) occurs until a positioning instruction (such as an instruction made by outputting a pulse or by communication) is started with respect to the drive unit, such as a servo amplifier, after a positioning start instruction is received from the CPU unit. This delay time is the data analysis time for generating positioning instruction data by executing a predetermined analytical computation upon receiving the positioning start instruction. In a positioning device having various positioning functions, the number of parameters is large and thus it takes a long time to analyze data; therefore, the positioning start time tends to be long.

There is a description in Patent Literature 1 of an industrial robot control device that sequentially analyzes and executes a plurality of instructions of a program, where the operating environment corresponding to an operation instruction is stored in time series in the time-series data memory when an operation of the motion controller is performed and, when a robot operation that has been suspended is resumed, the operation instruction that was being executed when the robot operation was suspended is read from the time-series data memory and is executed again. Thus, according to Patent Literature 1, it is possible to solve a problem that a robot operation is resumed by executing from the operation instruction next to the operation instruction that was being executed; therefore, the robot operation can be performed as was intended by the program.

Patent Literature 2 describes that the cam operation is reproduced by the feed operation of the motor shaft. Specifically, a data column of time-series instruction positions, each including the amount of correction, such as the delay in the servo system and the lost motion in the mechanical system, is stored in advance in each of the forward operation data table and the backward operation data table, the motor shaft is operated in the forward direction by generating a movement instruction by reading binary data directly from the forward operation data table, and the motor shaft is operated in the backward direction by generating a movement instruction by reading binary data directly from the backward operation data table, thereby performing a binary operation. Therefore, according to Patent Literature 2, even if the operation direction of the shaft is reversed a number of times during the binary operation, an inadvertent delay due to the effect of the delay in the servo system, the lost motion in the mechanical system, and the like is prevented.

CITATION LIST

Patent Literature

Patent Literature 1: Japanese Patent Application Laid-open No. H05-006213
Patent Literature 2: Japanese Patent Application Laid-open No. H10-301614

SUMMARY

Technical Problem

The technologies described in Patent Literature 1 and Patent Literature 2 are both technologies for causing an intended operation to be performed in accordance with the time-series instructions and there is no description of how to shorten the time until positioning is started for each instruction.

In the technology described in Patent Literature 1, the storage content of the time-series data memory is erased after an operation instruction finishes normally; therefore, when this operation instruction is executed again, it is necessary to perform the operation again starting from the analysis of the instruction of the program. Therefore, for the operation instruction, it is difficult to shorten the time from when the instruction is received to when positioning is started.

In the technology described in Patent Literature 2, it is considered that every time a position instruction is read from the forward operation data table or the backward operation data table, the position instruction is analyzed and a movement instruction is generated by using the analysis result. Therefore, for the position instruction, it is difficult to shorten the time from when the position instruction is received to when positioning is started.

On the other hand, if the positioning start time becomes long, a problem arises such that, for example, the takt time cannot be determined for a device that repeatedly frequently starts positioning, which may become a factor in degrading the performance of the device. Therefore, it is desired in many systems to obtain a positioning device in which the positioning start time is short.

The present invention has been achieved in view of the above and an object of the present invention is to obtain a positioning device and a PLC system capable of shortening the positioning start time.

Solution to Problem

In order to solve the above problems and achieve the object, a positioning device according to one aspect of the present invention includes a computing unit that analyzes a positioning start instruction that includes an operation pattern; a storage unit that stores therein an operation pattern and an analysis result obtained by the computing unit in association with each other; and an instruction generating unit that, when it is verified that an operation pattern corresponding to an operation pattern included in the positioning start instruction is stored in the storage unit, reads an analysis result associated with the corresponding operation pattern and generates positioning instruction data for positioning a control target by using a read analysis result.

Advantageous Effects of Invention

According to the present invention, when positioning is performed on an operation pattern that has been analyzed before, the positioning can be performed by using the analysis result stored in the storage unit. Accordingly, it is possible to omit the data analysis process on an operation pattern that has been analyzed before; therefore, the positioning start time can be shortened.

DESCRIPTION OF EMBODIMENTS

Exemplary embodiments of a PLC system according to the present invention will be explained below in detail with reference to the drawings. This invention is not limited to the embodiments.

Embodiment

Figure 1:
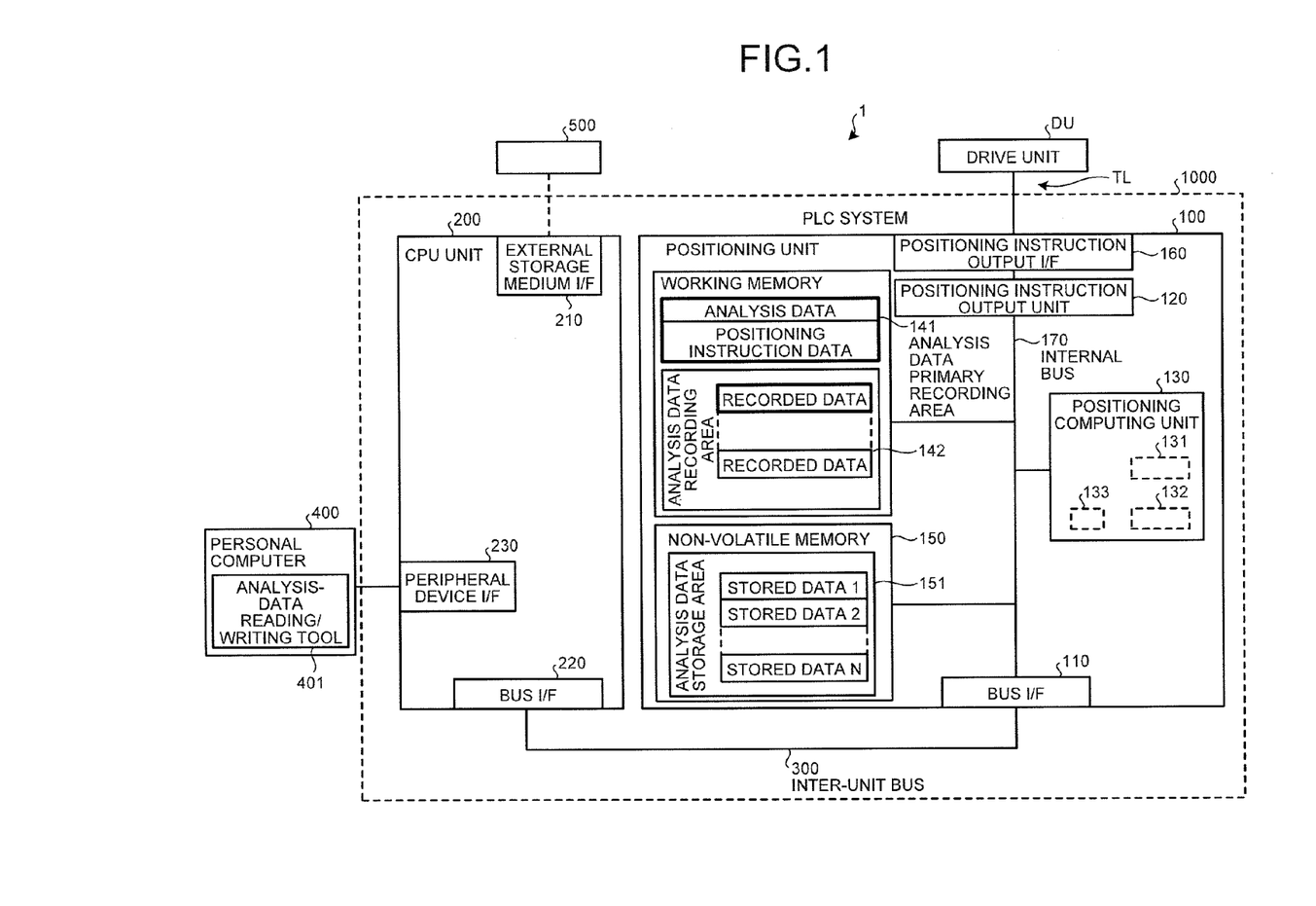
FIG. 1 is a diagram illustrating the configuration of a PLC system according to an embodiment.

A PLC system 1000 according to an embodiment will be explained with reference to FIG. 1. FIG. 1 is a diagram illustrating the configuration of the PLC system 1000.

The PLC system 1000 is a system for controlling an operation of a drive unit (control target) DU. The PLC system 1000 includes a positioning unit (positioning device) 100 and a CPU unit (control device) 200. The positioning unit 100 is connected to the CPU unit 200 via an inter-unit bus 300. The PLC system 1000, in addition to the positioning unit 100 and the CPU unit 200, may be provided with an analogue output unit that performs a D/A conversion on a digital value indicated by the CPU unit 200 and outputs an analogue value, a temperature controller unit that outputs a temperature control signal for heating and cooling such that the temperature indicated by the CPU unit 200 is reached, and the like, via the inter-unit bus 300; however, in this embodiment, reference is not made to the units other than the positioning unit 100 and the CPU unit 200.

The positioning unit 100 performs positioning data analysis on the basis of the positioning start instruction received from the CPU unit 200 and stores and retains the analysis data. Specifically, the positioning unit 100 includes a bus I/F 110, a positioning computing unit 130, a working memory 140, a positioning instruction output unit 120, and a positioning instruction output I/F 160. The bus I/F 110, the positioning computing unit 130, the working memory 140, the positioning instruction output unit 120, and the positioning instruction output I/F 160 are communicatively connected to one another via an internal bus 170. The positioning computing unit 130 includes a data analysis unit (computing unit) 131.

The bus I/F 110 receives a positioning start instruction from the CPU unit 200 via a bus I/F 220 and the inter-unit bus 300. The bus I/F 110 converts the received positioning start instruction into the data format corresponding to the internal bus 170 and supplies the converted positioning start instruction to the positioning computing unit 130.

The data analysis unit 131 of the positioning computing unit 130 analyzes the positioning start instruction that includes an operation pattern. The operation pattern includes, for example, a start address of the drive unit DU. The computation content to be analyzed includes a process for calculating data for moving to the position indicated on the basis of, for example, positioning data (such as a positioning address and an instruction speed), a current position, and other parameters (such as acceleration and deceleration time). The data analysis unit 131 writes the analysis result in the working memory 140. The positioning instruction output unit 120 outputs a positioning instruction on the basis of the analysis data read from the working memory 140.

The working memory 140 included in the positioning unit 100 will be explained here. In the working memory 140, an analysis data primary recording area 141, which is an area in which analysis data is recorded, is reserved. Generally, analysis data is overwritten with analysis data of the next positioning; therefore, it is necessary to perform data analysis again for positioning even on an operation pattern that has been analyzed before (positioning by the absolute value specifying method in which the start addresses match or positioning by the relative value specifying method in which the amount of relative movement is the same although the start addresses do not match). Consequently, a delay time (positioning start time) occurs until the positioning instruction is started.

Therefore, in the present embodiment, an analysis data recording area 142 is reserved separately from the analysis data primary recording area 141 so that the working memory 140 of the positioning unit 100 can store the past analysis data. In other words, the data analysis unit 131 writes analysis results in the analysis data recording area 142 of the working memory 140 in association with operation patterns. The analysis data recording area 142 of the working memory 140 stores therein operation patterns and analysis results obtained by the data analysis unit 131 in association with each other.

Figure 3:
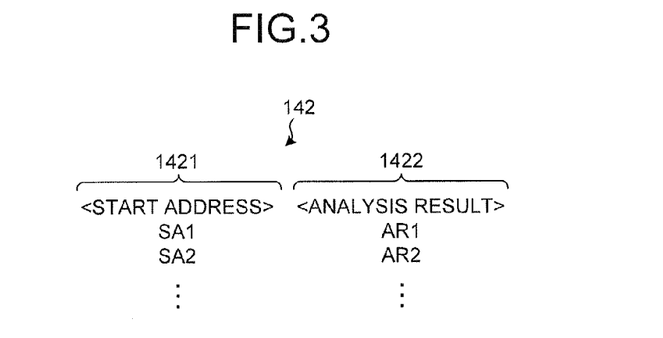
FIG. 3 is a diagram illustrating a data structure of an analysis data table according to the embodiment.

For example, as illustrated in FIG. 3, the analysis data recording area 142 includes a start address field 1421 and an analysis result field 1422. In the start address field 1421, start addresses SA1, SA2, . . . of the drive unit DU are recorded. Each of the start addresses SA1, SA2, . . . is included in a positioning start instruction analyzed by the data analysis unit 131. In the analysis result field 1422, analysis results AR1, AR2, . . . obtained by the data analysis unit 131 are recorded. Each of the analysis results AR1, AR2, . . . includes, for example, a positioning address, an instruction speed, a result of the interpolation process, a result of the acceleration and deceleration process, and the like.

Moreover, the positioning computing unit 130 further includes a positioning instruction generating unit 132. The positioning computing unit 130 verifies whether the operation pattern corresponding to the operation pattern included in the next positioning start instruction is stored, for example, in the analysis data recording area 142. The positioning computing unit 130 supplies the verification result to the positioning instruction generating unit 132.

For example, when the positioning start instruction is compatible with the absolute value specifying method and the start address (see FIG. 3) corresponding to the start address included in the positioning start instruction is stored in the analysis data recording area 142, the positioning computing unit 130 determines that the operation pattern corresponding to the operation pattern included in the positioning start instruction is stored in the analysis data recording area 142. In other words, in this case, the positioning computing unit 130 verifies that the operation pattern corresponding to the operation pattern included in the positioning start instruction is stored in the analysis data recording area 142. For example, when the positioning start instruction is compatible with the absolute value specifying method and the start address (see FIG. 3) corresponding to the start address included in the positioning start instruction is not stored in the analysis data recording area 142, the positioning computing unit 130 determines that the operation pattern corresponding to the operation pattern included in the positioning start instruction is not stored in the analysis data recording area 142. In other words, in this case, the positioning computing unit 130 verifies that the operation pattern corresponding to the operation pattern included in the positioning start instruction is not stored in the analysis data recording area 142.

For example, when the positioning start instruction is compatible with the relative value specifying method, the positioning computing unit 130 determines that the operation pattern corresponding to the operation pattern included in the positioning start instruction is stored in the analysis data recording area 142 regardless of whether the start address (see FIG. 3) corresponding to the start address included in the positioning start instruction is stored in the analysis data recording area 142. For example, even when the start address (see FIG. 3) matching the start address included in the positioning start instruction is not stored in the analysis data recording area 142, if there is an analysis result corresponding to the amount of relative movement included in the positioning start instruction among the analysis results stored in the analysis data recording area 142, the positioning computing unit 130 can use the analysis result as the analysis result corresponding to the operation pattern included in the positioning start instruction. In other words, in this case, the positioning computing unit 130 verifies that the operation pattern corresponding to the operation pattern included in the positioning start instruction is stored in the analysis data recording area 142.

When it is verified that the operation pattern corresponding to the operation pattern included in the positioning start instruction is stored in the analysis data recording area 142, the positioning instruction generating unit 132 reads the analysis result associated with the corresponding operation pattern. Then, the positioning instruction generating unit 132 generates and outputs positioning instruction data for positioning the drive unit DU by using the read analysis result.

Alternatively, when it is verified that the operation pattern corresponding to the operation pattern included in the positioning start instruction is not stored in the analysis data recording area 142, the positioning instruction generating unit 132 performs control such that the data analysis unit 131 analyzes the positioning start instruction. Then, upon receiving the analysis result from the data analysis unit 131, the positioning instruction generating unit 132 generates and outputs positioning instruction data by using the received analysis result.

The positioning instruction output I/F 160 converts the positioning instruction output from the positioning instruction output unit 120 into a data format compatible with a communication line TL and transmits the converted positioning instruction to the drive unit DU via the communication line TL. Accordingly, the drive unit DU performs an operation according to the positioning instruction.

Figure 2:
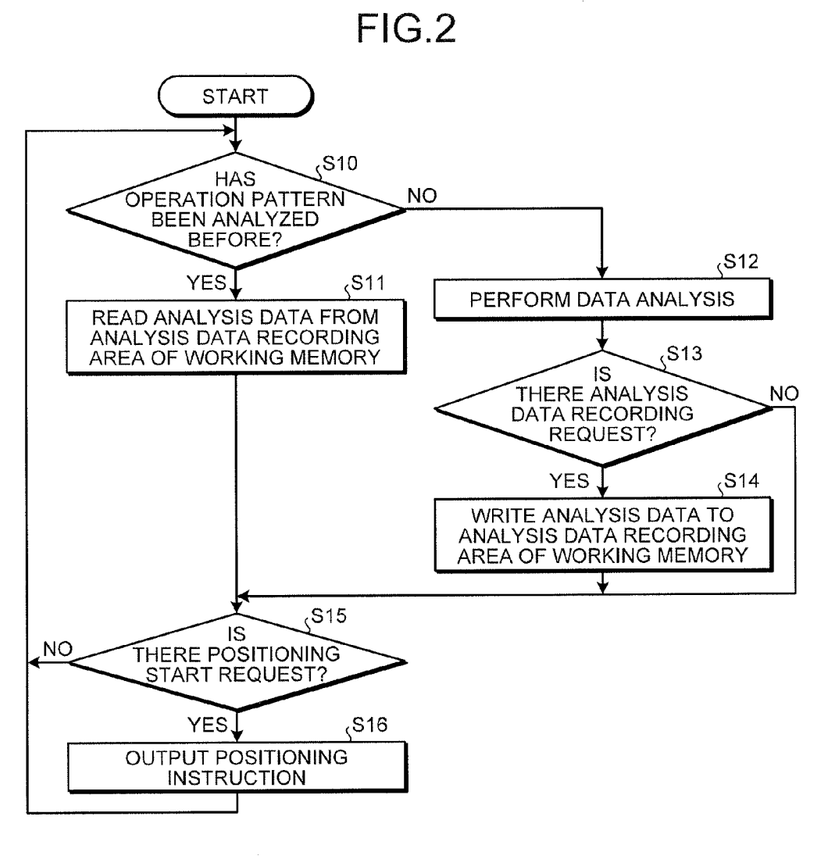
FIG. 2 is a flowchart illustrating the operation of the PLC system according to the embodiment.

Next, the operation of the PLC system 1000 will be explained with reference to FIG. 2. FIG. 2 is a flowchart illustrating the operation of the PLC system 1000.

In Step S10, the positioning computing unit 130 determines whether the operation pattern is an operation pattern that has been analyzed before. Specifically, the positioning computing unit 130 determines whether the operation pattern corresponding to the operation pattern included in the positioning start instruction is stored, for example, in the analysis data recording area 142. In other words, the positioning computing unit 130 verifies whether the operation pattern corresponding to the operation pattern that is to be operated next and is included in the positioning start instruction is stored, for example, in the analysis data recording area 142.

For example, when the positioning start instruction is compatible with the absolute value specifying method and the start address (see FIG. 3) corresponding to the start address included in the positioning start instruction is stored in the analysis data recording area 142, the positioning computing unit 130 determines that the operation pattern corresponding to the operation pattern included in the positioning start instruction is stored in the analysis data recording area 142. In other words, in this case, the positioning computing unit 130 verifies that the operation pattern corresponding to the operation pattern included in the positioning start instruction is stored in the analysis data recording area 142. For example, when the positioning start instruction is compatible with the absolute value specifying method and the start address (see FIG. 3) corresponding to the start address included in the positioning start instruction is not stored in the analysis data recording area 142, the positioning computing unit 130 determines that the operation pattern corresponding to the operation pattern included in the positioning start instruction is not stored in the analysis data recording area 142. In other words, in this case, the positioning computing unit 130 verifies that the operation pattern corresponding to the operation pattern included in the positioning start instruction is not stored in the analysis data recording area 142.

For example, when the positioning start instruction is compatible with the relative value specifying method, the positioning computing unit 130 determines that the operation pattern corresponding to the operation pattern included in the positioning start instruction is stored in the analysis data recording area 142 regardless of whether the start address (see FIG. 3) corresponding to the start address included in the positioning start instruction is stored in the analysis data recording area 142. For example, even when the start address (see FIG. 3) matching the start address included in the positioning start instruction is not stored in the analysis data recording area 142, if there is an analysis result corresponding to the amount of relative movement included in the positioning start instruction among the analysis results stored in the analysis data recording area 142, the positioning computing unit 130 can use the analysis result as the analysis result corresponding to the operation pattern included in the positioning start instruction. In other words, in this case, the positioning computing unit 130 verifies that the operation pattern corresponding to the operation pattern included in the positioning start instruction is stored in the analysis data recording area 142.

Then, when the positioning computing unit 130 determines that the operation pattern corresponding to the operation pattern that is to be operated next and is included in the positioning start instruction is stored, for example, in the analysis data recording area 142, i.e., when the positioning computing unit 130 verifies that the operation pattern corresponding to the operation pattern that is to be operated next and is included in the positioning start instruction is stored, for example, in the analysis data recording area 142, the positioning computing unit 130 determines that the operation pattern is an operation pattern that has been analyzed before (Yes in Step S10) and moves the process to Step S11.

In Step S11, the positioning computing unit 130 reads the analysis data from the analysis data recording area 142. In other words, the positioning computing unit 130 reads the analysis data associated with the operation pattern corresponding to the operation pattern included in the positioning start instruction and moves the process to Step S15.

In contrast, in Step S10, when the positioning computing unit 130 determines that the operation pattern corresponding to the operation pattern that is to be operated next and is included in the positioning start instruction is not stored, for example, in the analysis data recording area 142, i.e., when the positioning computing unit 130 verifies that the operation pattern corresponding to the operation pattern that is to be operated next and is included in the positioning start instruction is not stored, for example, in the analysis data recording area 142, the positioning computing unit 130 determines that the operation pattern is not an operation pattern that has been analyzed before (No in Step S10) and moves the process to Step S12.

In Step S12, the positioning computing unit 130 performs positioning data analysis. The positioning computing unit 130 performs a predetermined analytical computation (for example, calculation of a positioning address and an acceleration and deceleration process) on the positioning start instruction.

In Step S13, the positioning computing unit 130 determines whether there is an analysis data recording request. The positioning computing unit 130 receives an analysis data recording request, for example, from the CPU unit 200 via the inter-unit bus 300, the bus I/F 110, and the internal bus 170. When the positioning computing unit 130 receives an analysis data recording request (Yes in Step S13), the positioning computing unit 130 moves the process to Step S14. When the positioning computing unit 130 does not receive an analysis data recording request (No in Step S13), the positioning computing unit 130 moves the process to Step S15.

In Step S14, the positioning computing unit 130 outputs the data of the analysis result (analysis data) to the analysis data recording area 142 and moves the process to Step S15.

In Step S15, the positioning computing unit 130 determines whether there is a positioning start request. When the positioning computing unit 130 does not receive a positioning start instruction, the positioning computing unit 130 determines that a positioning start request is not received (No in Step S15) and returns the process to Step S10. When the positioning computing unit 130 receives a positioning start instruction, the positioning computing unit 130 determines that a positioning start request is received (Yes in Step S15) and moves the process to Step S16.

In Step S16, the positioning computing unit 130 generates positioning instruction data by using the analysis result and supplies it to the positioning instruction output unit 120. The positioning instruction output unit 120 outputs the positioning instruction data to the drive unit DU via the positioning instruction output I/F 160 and the communication line TL. Thereafter, the positioning computing unit 130 returns the process to Step S10.

Figure 4:
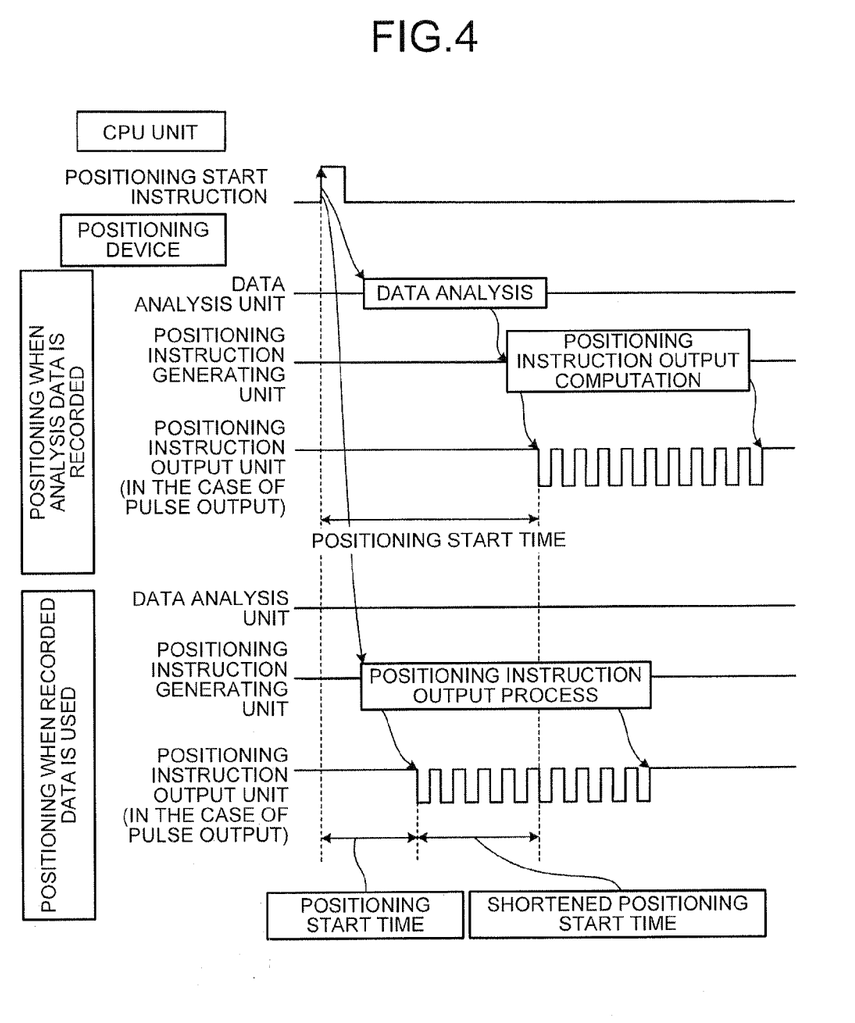
FIG. 4 is a diagram illustrating the effect in the embodiment.

Here, it is assumed that the working memory 140 does not include the analysis data recording area 142. In this case, analysis data stored in the analysis data primary recording area 141 is overwritten with analysis data of the next positioning; therefore, it is necessary to perform data analysis again for positioning even on an operation pattern that has been analyzed before (for example, positioning by the absolute value specifying method in which the start addresses match or positioning by the relative value specifying method in which the amount of relative movement is the same although the start addresses do not match). Consequently, a delay time (positioning start time) occurs until the positioning instruction is started (see "positioning when analysis data is recorded" in FIG. 4).

In contrast, in the present embodiment, the working memory 140 includes the analysis data recording area 142. The analysis data recording area 142 stores therein operation patterns and analysis results obtained by the data analysis unit (computing unit) 131 in association with each other. When it is verified that the operation pattern corresponding to the operation pattern included in the positioning start instruction is stored in the analysis data recording area 142, the positioning instruction generating unit 132 reads the analysis result associated with the corresponding operation pattern and generates positioning instruction data for positioning the drive unit DU by using the read analysis result. Therefore, when positioning is performed on an operation pattern that has been analyzed before, the positioning can be performed by using the analysis data stored in the analysis data recording area 142. Accordingly, it is possible to omit the data analysis process on an operation pattern that has been analyzed before. Thus, the positioning start time can be shortened and therefore high-speed positioning start can be realized (see "positioning when recorded data is used" in FIG. 4).

Alternatively, if the positioning method is limited to the relative value specifying method, data analysis can be performed in advance on the basis of the setting data. However, when a positioning address is obtained by using a teaching method or the like, the absolute value specifying method is always used as a positioning method. Therefore, the user needs to convert the method into the relative value specifying method (calculate the amount of relative movement) in order to perform high-speed positioning start.

In contrast, in the present embodiment, for example, when the positioning start instruction is compatible with the absolute value specifying method and the start address (see FIG. 3) corresponding to the start address included in the positioning start instruction is stored in the analysis data recording area 142, the positioning computing unit 130 determines that the operation pattern corresponding to the operation pattern included in the positioning start instruction is stored in the analysis data recording area 142. In other words, the positioning computing unit 130 verifies that the operation pattern corresponding to the operation pattern included in the positioning start instruction is stored in the analysis data recording area 142. Alternatively, for example, when the positioning start instruction is compatible with the relative value specifying method and the start address (see FIG. 3) matching the start address included in the positioning start instruction is not stored in the analysis data recording area 142, if there is an analysis result corresponding to the amount of relative movement included in the positioning start instruction among the analysis results stored in the analysis data recording area 142, the positioning computing unit 130 uses the analysis result as the analysis result corresponding to the operation pattern included in the positioning start instruction. In other words, the positioning computing unit 130 verifies that the operation pattern corresponding to the operation pattern included in the positioning start instruction is stored in the analysis data recording area 142. Accordingly, it is possible to omit the data analysis process on an operation pattern that has been analyzed before regardless of whether the absolute value specification is used or the relative value specification is used. In other words, the positioning start time can be shortened regardless of whether the absolute value specification is used or the relative value specification is used and therefore high-speed positioning start can be realized.

Moreover, in the present embodiment, the analysis data recording area 142 stores therein a plurality of operation patterns and a plurality of analysis results in association with each other. Accordingly, it is possible to omit the data analysis process on a plurality of operation patterns that have been analyzed before.

In the present embodiment described above, as an example, the positioning computing unit 130 verifies whether the operation pattern corresponding to the operation pattern that is to be operated next and is included in the positioning start instruction is stored, for example, in the analysis data recording area 142; however, a computing unit other than the positioning computing unit 130 in the positioning unit 100 may verify whether the operation pattern corresponding to the operation pattern that is to be operated next and is included in the positioning start instruction is stored, for example, in the analysis data recording area 142.

Alternatively, the analysis result stored in the analysis data recording area 142 may further include intermediate data when positioning instruction data is generated by the positioning instruction generating unit 132 in addition to analysis results obtained by the data analysis unit 131. In this case, the positioning instruction generating unit 132 can generate positioning instruction data by using the intermediate data corresponding to the analysis result in addition to the analysis result; therefore, the positioning instruction time can be further shortened.

Moreover, the positioning unit 100 may include an analysis data storage area 151 instead of the analysis data recording area 142. In other words, the data analysis unit 131 writes analysis results in the analysis data storage area 151 of a non-volatile memory 150 in association with operation patterns. Accordingly, the recorded analysis data can be retained even if the power supply is turned off.

Alternatively, as illustrated in FIG. 1, the positioning unit 100 may further include the non-volatile memory 150 for retaining analysis data even if the power supply is turned off in addition to the analysis data recording area 142. In other words, the data analysis unit 131 may associate analysis results with operation patterns, and write them in the analysis data recording area 142 of the working memory 140 and write them also in the analysis data storage area 151 of the non-volatile memory 150. The analysis data storage area 151 of the non-volatile memory 150 stores therein operation patterns and analysis results obtained by the data analysis unit 131 in association with each other and in a non-volatile manner. In other words, the storage content of the analysis data recording area 142 may be backed up in the analysis data storage area 151. Accordingly, even if the power supply is turned off, the recorded analysis data can be retained, and the backed-up data can be restored to the analysis data recording area 142 after the power supply is turned on.

Therefore, in any case, if analysis data is stored in the analysis data storage area 151 when the positioning operation is verified at the time of start-up of the system, when the system is operated, positioning is performed by reading the stored data, whereby high-speed positioning start can be realized from the first positioning after the system is operated.

Moreover, even when analysis data is not stored in the analysis data storage area 151, for example, if the positioning data of the operation pattern to be operated next is analyzed in advance, for example, while the system is not in operation, and is stored in the analysis data recording area 142 and the analysis data storage area 151, high-speed positioning start can be realized even in the case of positioning of an operation pattern that is operated for the first time.

Alternatively, the backup destination of the storage content of the analysis data recording area 142 may be a peripheral device 400 connected to the CPU unit 200. Specifically, the CPU unit 200 includes a peripheral device I/F 230 and can be connected to the peripheral device 400 via the peripheral device I/F 230. The peripheral device 400 is, for example, a personal computer. In the peripheral device 400, for example, an analysis-data reading/writing tool 401, which operates on the peripheral device 400, is installed. When the peripheral device 400 is connected to the CPU unit 200, the CPU unit 200 backs up the storage content of the analysis data recording area 142 by transferring and writing the data in the analysis data recording area 142 of the positioning unit 100 to the peripheral device 400 in accordance with a backup instruction received from a user using the peripheral device 400 via the analysis-data reading/writing tool 401. Moreover, when the peripheral device 400 is connected to the CPU unit 200, the CPU unit 200 restores the storage content of the analysis data recording area 142 by transferring and reading the data written in the peripheral device 400 to the positioning unit 100 in accordance with a restore instruction received from a user using the peripheral device 400 via the analysis-data reading/writing tool 401. Accordingly, when the system is operated, positioning is performed by restoring the backed-up data, whereby high-speed positioning start can be realized from the first positioning after the system is operated.

Alternatively, the backup destination of the storage content of the analysis data recording area 142 may be an external storage medium 500 connected to the CPU unit 200. Specifically, the CPU unit 200 includes an external storage medium IF 210 and can be connected to the external storage medium 500 via the external storage medium IF 210. The external storage medium 500 is, for example, a memory card. When the external storage medium 500 is connected to the CPU unit 200, the CPU unit 200, for example, detects the connection as a backup instruction and backs up the storage content of the analysis data recording area 142 by transferring and writing the data in the analysis data recording area 142 of the positioning unit 100 to the external storage medium 500. Moreover, when the external storage medium 500 is connected to the CPU unit 200, the CPU unit 200, for example, detects that the positioning unit 100 is turned on as a restore instruction and restores the storage content of the analysis data recording area 142 by transferring and reading the data written in the external storage medium 500 to the positioning unit 100. Accordingly, when the system is operated, positioning is performed by restoring the backed-up data, whereby high-speed positioning start can be realized from the first positioning after the system is operated.

Alternatively, it is possible to store in advance analysis data in the external storage medium 500 mounted in the external storage medium I/F 210 of the CPU unit 200, read the data to the positioning unit 100 via the inter-unit bus 300, and load the data in the analysis data recording area 142 and the analysis data storage area 151.

Figure 5:
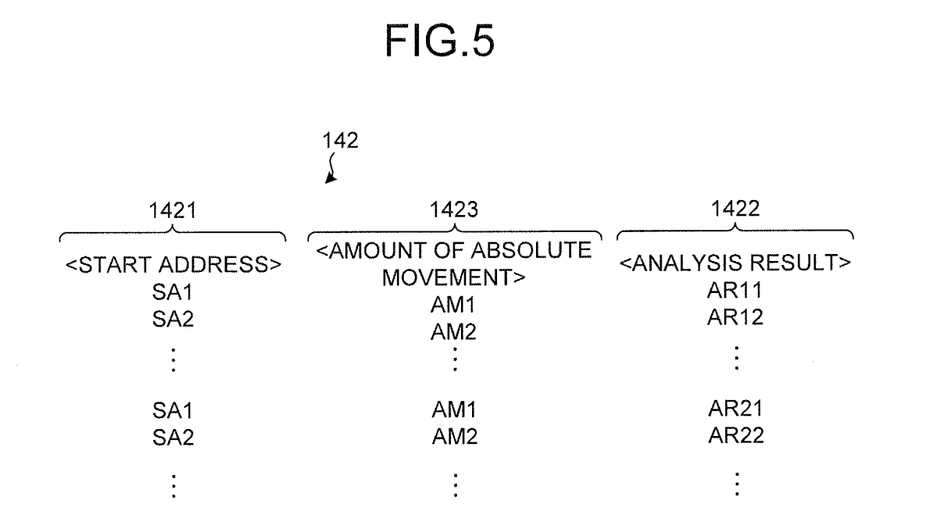
FIG. 5 is a diagram illustrating a data structure of an analysis data table according to a modified example of the embodiment.

Alternatively, the analysis data recording area 142 may store therein start addresses and the amounts of absolute movement as operation patterns. In this case, for example, as illustrated in FIG. 5, the analysis data recording area 142 includes the start address field 1421, an amount-of-absolute-movement field 1423, and the analysis result field 1422. In the amount-of-absolute-movement field 1423, amounts of absolute movement AM1, AM2, . . . , AM1, AM2, . . . of the drive unit DU are recorded. Each of the amounts of absolute movement AM1, AM2, . . . is included in a positioning start instruction analyzed by the data analysis unit 131. In the analysis result field 1422, analysis results AR11, AR12, . . . , AR21, AR22, . . . obtained by the data analysis unit 131 are recorded. Each of the analysis results AR11, AR12, . . . includes, for example, a positioning address, an instruction speed, a result of the interpolation process, a result of the acceleration and deceleration process, and the like.

At this point, when the positioning start instruction is compatible with the absolute value specifying method and the start address and the amount of absolute movement (see FIG. 5) corresponding to the start address and the amount of absolute movement included in the positioning start instruction are stored in the analysis data recording area 142, the positioning computing unit 130 illustrated in FIG. 1 determines that the operation pattern corresponding to the operation pattern included in the positioning start instruction is stored in the analysis data recording area 142. In other words, the positioning computing unit 130 verifies that the operation pattern corresponding to the operation pattern that is to be operated next and is included in the positioning start instruction is stored in the analysis data recording area 142. Then, when it is verified that the start address and the amount of absolute movement corresponding to the start address and the amount of absolute movement included in the positioning start instruction are stored in the analysis data recording area 142, the positioning instruction generating unit 132 reads the analysis result (analysis data) associated with the corresponding start address and amount of absolute movement and generates positioning instruction data by using the read analysis result. Accordingly, even when the drive unit DU is controlled by selecting any of a plurality of amounts of absolute movement from one start address, the positioning instruction time can be shortened.

Figure 6:
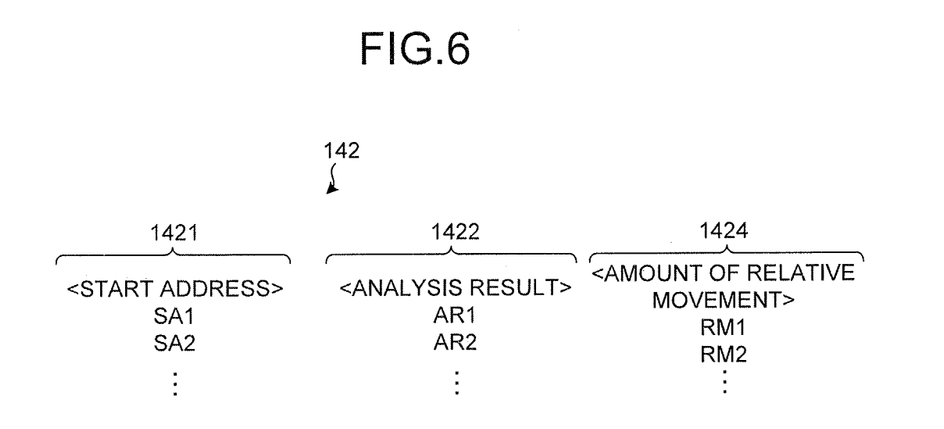
FIG. 6 is a diagram illustrating a data structure of an analysis data table according to a modified example of the embodiment.

Alternatively, as illustrated in FIG. 1, the positioning computing unit 130 may further include a converting unit 133. When the positioning start instruction includes the amount of absolute movement, the converting unit 133 converts the amount of absolute movement into the amount of relative movement and stores the converted amount of relative movement in the analysis data recording area 142 in association with the start address and the analysis result. The analysis data recording area 142 stores therein start addresses, analysis results, and the amounts of relative movement in association with each other. In this case, for example, as illustrated in FIG. 6, the analysis data recording area 142 includes the start address field 1421, the analysis result field 1422, and an amount-of-relative-movement field 1424. In the amount-of-relative-movement field 1424, amounts of relative movement RM1, RM2, . . . of the drive unit DU are recorded. Each of the amounts of relative movement RM1, RM2, . . . is a result converted by the converting unit 133.

At this point, when the positioning start instruction is compatible with the relative value specifying method and the amount of relative movement (see FIG. 6) corresponding to the amount of relative movement included in the positioning start instruction is stored in the analysis data recording area 142, the positioning computing unit 130 illustrated in FIG. 1 determines that the operation pattern corresponding to the operation pattern included in the positioning start instruction is stored in the analysis data recording area 142. In other words, the positioning computing unit 130 verifies that the operation pattern corresponding to the operation pattern that is to be operated next and is included in the positioning start instruction is stored in the analysis data recording area 142. Then, when it is verified that the amount of relative movement corresponding to the amount of relative movement included in the positioning start instruction is stored in the analysis data recording area 142, the positioning instruction generating unit 132 reads the analysis result (analysis data) associated with the corresponding amount of relative movement and generates positioning instruction data by using the read analysis result. Accordingly, when the positioning method is the relative value specifying method, the time to specify the corresponding analysis result can be shortened; therefore, the positioning instruction time can be further shortened.

INDUSTRIAL APPLICABILITY

As described above, the positioning device according to the present invention is useful for positioning a control target.

REFERENCE SIGNS LIST

100 positioning unit, 110 bus I/F, 120 positioning instruction output unit, 130 positioning computing unit, 131 data analysis unit, 132 positioning instruction generating unit, 133 converting unit, 140 working memory, 141 analysis data primary recording area, 142 analysis data recording area, 150 non-volatile memory, 151 analysis data storage area, 160 positioning instruction output I/F, 200 CPU unit, 210 external storage medium I/F, 220 bus I/F, 230 peripheral device I/F, 300 inter-unit bus, 400 peripheral device, 401 analysis-data reading/writing tool, 1000 PLC system.

The invention claimed is:

1. A positioner configured to position a hardware device, the positioner comprising:
   an analyzer that analyzes a positioning start instruction that includes an operation pattern including a start address which is a location at which the hardware device begins moving according to the operation pattern;
   a memory that stores therein an operation pattern and an analysis result obtained by the analyzer analyzing the operation pattern stored in the memory in association with each other; and
   an instruction generator comprising a processor that, based on whether the operation pattern stored in the memory corresponds to the operation pattern included in the positioning start instruction, reads the analysis result associated with the operation pattern stored in the memory and generates positioning instruction data for positioning a control target that is the hardware device by using the read analysis result, wherein the instruction generator determines whether the operation pattern stored in the memory corresponds to the operation pattern included in the positioning start instruction by analyzing the operation pattern stored in the memory, the operation pattern included in the positioning start instruction, and the start address in response to determining that the positioning start instruction is compatible with a first value specifying method, and analyzing the operation pattern stored in the memory and the operation pattern included in the positioning start instruction while omitting the analyzing of the start address in response to determining that the positioning start instruction is compatible with a second value specifying method, and wherein, by generating the positioning instruction data based on the operation pattern stored in the memory, the instruction generator reduces a positioning start time of the positioner as compared to a positioning start time when the positioning instruction data is not generated based on the operation pattern stored in the memory, to thereby achieve a high-speed positioning start.

2. The positioner according to claim 1, wherein when it is verified that an operation pattern corresponding to the operation pattern included in the positioning start instruction is not stored in the memory, the instruction generator performs control such that the analyzer analyzes the positioning start instruction to thereby generate another analysis result and generates the positioning instruction data by using the other analysis result generated by the analyzer.

3. The positioner according to claim 1, wherein when it is verified that an operation pattern corresponding to the operation pattern included in the positioning start instruction is not stored in the memory, the instruction generator performs control such that the analyzer analyzes the positioning start instruction to thereby generate an another analysis result and stores the other analysis result generated by the analyzer in the memory.

4. The positioner according to claim 3, wherein when it is verified, during an operation of the operation pattern included in the positioning start instruction, that an operation pattern that is to be operated next and is included in the positioning start instruction is not stored in the memory, the instruction generator performs control such that the analyzer analyzes the positioning start instruction to thereby generate another analysis result and stores the other analysis result analyzed by the analyzer in the memory.

5. The positioner according to claim 1, wherein
when it is verified that a start address stored in the memory corresponds to the start address included in the operation pattern included in the positioning start instruction, the instruction generator reads an analysis result associated with the corresponding start address and generates the positioning instruction data by using the read analysis result.

6. The positioner according to claim 5, wherein
the operation pattern included in the positioning start instruction further includes an amount of absolute movement of the control target, and when the positioning start instruction is compatible with the first value specifying method which is an absolute value specifying method and it is verified that a start address and an amount of absolute movement stored in the memory correspond to the start address and the amount of absolute movement included in the operation pattern included in the positioning start instruction, the instruction generator reads an analysis result associated with the start address and the amount of absolute movement stored in the memory and generates the positioning instruction data by using the read analysis result.

7. The positioner according to claim 1, wherein
the operation pattern included in the positioning start instruction includes an amount of relative movement of the control target, and when the positioning start instruction is compatible with the second value specifying method which is a relative value specifying method and it is verified that an amount of relative movement stored in the memory corresponds to the amount of relative movement included in the operation pattern included in the positioning start instruction, the instruction generator reads an analysis result associated with the amount of relative movement stored in the memory and generates the positioning instruction data by using the read analysis result.

8. The positioner according to claim 1, further comprising a converter that, when the operation pattern included in the positioning start instruction includes an amount of absolute movement, converts the amount of absolute movement into an amount of relative movement, wherein
the memory stores therein an operation pattern, an analysis result obtained by the analyzer, and an amount of relative movement converted by the converter in association with each other, and when it is verified that the amount of relative movement stored in the memory corresponds to the amount of relative movement included in the operation pattern included in the positioning start instruction, the instruction generator reads an analysis result associated with the amount of relative movement stored in the memory and generates the positioning instruction data by using the read analysis result.

9. The positioner according to claim 1, wherein the memory stores therein a plurality of operation patterns and a plurality of analysis results in association with each other.

10. The positioner according to claim 1, wherein the memory stores therein an operation pattern and an analysis result obtained by the analyzer in association with each other and in a non-volatile manner.

11. A PLC system comprising:
a positioner configured to position a hardware device, the positioner comprising:
an analyzer that analyzes a positioning start instruction that includes an operation pattern including a start address which is a location at which the hardware device begins moving according to the operation pattern;
a memory that stores therein an operation pattern and an analysis result obtained by the analyzer analyzing the operation pattern stored in the memory in association with each other; and
an instruction generator comprising a processor that, based on whether the operation pattern stored in the memory corresponds to the operation pattern included in the positioning start instruction, reads the analysis result associated with the operation pattern stored in the memory and generates positioning instruction data for positioning a control target that is the hardware device by using the read analysis result; and
a controller that controls the positioner and is capable of being connected to a peripheral device, wherein when the peripheral device is connected to the controller, the controller backs up a storage content of the memory by transferring and writing data in the memory of the positioner to the peripheral device, wherein the instruction generator determines whether the operation pattern stored in the memory corresponds to the operation pattern included in the positioning start instruction by analyzing the operation pattern stored in the memory, the operation pattern included in the positioning start instruction, and the start address in response to determining that the positioning start instruction is compatible with a first value specifying method, and analyzing the operation pattern stored in the memory and the operation pattern included in the positioning start instruction while omitting the analyzing of the start address in response to determining that the positioning start instruction is compatible with a second value specifying method, and wherein, by generating the positioning instruction data based on the operation pattern stored in the memory, the instruction generator reduces a positioning start time of the positioner as compared to a positioning start time when the positioning instruction data is not generated based on the operation pattern stored in the memory, to thereby achieve a high-speed positioning start.

12. The PLC system according to claim 11, wherein when the peripheral device is connected to the controller, the controller restores a storage content of the memory by transferring and reading data written in the peripheral device to the positioner.

13. A PLC system comprising:

a positioner configured to position a hardware device, the positioner comprising:

an analyzer that analyzes a positioning start instruction that includes an operation pattern including a start address which is a location at which the hardware device begins moving according to the operation pattern;

a memory that stores therein an operation pattern and an analysis result obtained by the analyzer analyzing the operation pattern stored in the memory in association with each other; and an instruction generator comprising a processor that, based on whether the operation pattern stored in the memory corresponds to the operation pattern included in the positioning start instruction, reads the analysis result associated with the operation pattern stored in the memory and generates positioning instruction data for positioning a control target that is the hardware device by using the read analysis result; and a controller that controls the positioner and is capable of being connected to an external storage medium, wherein when the external storage medium is connected to the controller, the controller backs up a storage content of the memory by transferring and writing the storage content of the memory of the positioner to the external storage medium, wherein the instruction generator determines whether the operation pattern stored in the memory corresponds to the operation pattern included in the positioning start instruction by analyzing the operation pattern stored in the memory, the operation pattern included in the positioning start instruction, and the start address in response to determining that the positioning start instruction is compatible with a first value specifying method, and analyzing the operation pattern stored in the memory and the operation pattern included in the positioning start instruction while omitting the analyzing of the start address in response to determining that the positioning start instruction is compatible with a second value specifying method, and wherein, by generating the positioning instruction data based on the operation pattern stored in the memory, the instruction generator reduces a positioning start time of the positioner as compared to a positioning start time when the positioning instruction data is not generated based on the operation pattern stored in the memory, to thereby achieve a high-speed positioning start.

14. The PLC system according to claim 13, wherein when the external storage medium is connected to the controller, the controller restores a storage content of the memory by transferring and reading data written in the external storage medium to the positioner.

* * * * *